US012087477B2

(12) United States Patent
Yamamoto et al.

(10) Patent No.: US 12,087,477 B2
(45) Date of Patent: Sep. 10, 2024

(54) CHIP RESISTOR

(71) Applicant: Panasonic Intellectual Property Management Co., Ltd., Osaka (JP)

(72) Inventors: Yuusuke Yamamoto, Fukui (JP); Ryusei Fujita, Fukui (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 240 days.

(21) Appl. No.: 17/755,584

(22) PCT Filed: Nov. 17, 2020

(86) PCT No.: PCT/JP2020/042745
§ 371 (c)(1),
(2) Date: May 2, 2022

(87) PCT Pub. No.: WO2021/106676
PCT Pub. Date: Jun. 3, 2021

(65) Prior Publication Data

US 2022/0367089 A1 Nov. 17, 2022

(30) Foreign Application Priority Data

Nov. 25, 2019 (JP) ................................ 2019-212330
Apr. 3, 2020 (JP) ................................ 2020-067178

(51) Int. Cl.
*H01C 1/14* (2006.01)
*H01C 1/032* (2006.01)
*H01C 7/00* (2006.01)

(52) U.S. Cl.
CPC ............... *H01C 1/14* (2013.01); *H01C 1/032* (2013.01); *H01C 7/00* (2013.01)

(58) Field of Classification Search
CPC . H01C 1/14; H01C 1/032; H01C 7/00; H01C 17/242; H01C 17/22
See application file for complete search history.

(56) References Cited

U.S. PATENT DOCUMENTS 6,166,620 A * 12/2000 Inuzuka .............. H01C 17/281 338/311
2003/0164369 A1* 9/2003 Goetz .................... H01C 17/08 29/611
2014/0367153 A1 12/2014 Yoneda

FOREIGN PATENT DOCUMENTS

JP 6-031101 U 4/1994
JP 2000-106301 4/2000
(Continued)

OTHER PUBLICATIONS

International Search Report of PCT application No. PCT/JP2020/042745 dated Dec. 28, 2020.

*Primary Examiner* — Kyung S Lee
(74) *Attorney, Agent, or Firm* — Rimon P.C.

(57) ABSTRACT

An object is to provide a chip resistor capable of coping with high power. A chip resistor of the present disclosure includes insulating substrate, a pair of electrodes, and resistance member. A pair of electrodes are provided at both ends of the upper face of insulating substrate. Resistance member is provided on insulating substrate and connected to the pair of electrodes. Insulating substrate has first region in the center thereof and second regions at both ends of first region. Recess is provided in first region of insulating substrate. Resistance member formed in first region has a meandering shape in a top view. At least a part of resistance member is embedded in recess. Trimming groove is provided in resistance member formed in second region.

2 Claims, 12 Drawing Sheets

(56) References Cited

FOREIGN PATENT DOCUMENTS

| | | |
|---|---|---|
| JP | 2001-237102 | 8/2001 |
| JP | 2010-118430 | 5/2010 |
| JP | 2013-058783 | 3/2013 |
| JP | 2015-002212 | 1/2015 |

* cited by examiner

PRIOR ART

PRIOR ART

CHIP RESISTOR

FIELD OF THE INVENTION

The present disclosure relates to a chip resistor formed of a thick-film resistance member used in various electronic devices, and particularly to a chip resistor used in an electronic device requiring high power.

DESCRIPTION OF THE RELATED ART

As illustrated in FIGS. 20 and 21, a conventional chip resistor includes substrate 1 made of an insulator, a pair of electrodes 2, layer 3 made of a resistance member, protective films 4*a*, 4*b*, electrodes 5 provided on a pair of end faces, and metal layer 6 formed by plating. The pair of electrodes 2 are provided at both ends of the upper face of substrate 1, respectively. Layer 3 made of the resistance member is provided on the upper face of substrate 1 and between the pair of electrodes 2. Protective films 4*a*, 4*b* are provided to cover at least layer 3 made of the resistance member. The pair of electrodes 5 are provided on both end faces of substrate 1 so as to be electrically connected to the pair of electrodes 2, respectively. Metal layer 6 is provided on a part of the surface of each of the pair of electrodes 2 and each of the surface of the pair of electrodes 5. Layer 3 made of the resistance member is formed in a meandering shape. Note that FIG. 20 is a top view of the conventional chip resistor. FIG. 21 is a cross-sectional view of the chip resistor illustrated in FIG. 20 taken along line XXI-XXI.

Note that the conventional chip resistor illustrated in FIGS. 20 and 21 is disclosed in, for example, PTL 1.

As illustrated in FIG. 22, a conventional chip resistor different from the above chip resistor includes substrate 1 made of an insulator, a pair of electrodes 2, layer 3 made of a resistance member, protective film 4, and glass layer 8. A recess is formed in substrate 1, and glass layer 8 is provided at the bottom of the recess. Layer 3 made of the resistance member is provided in the recess of substrate 1 and on glass layer 8. The pair of electrodes 2 are provided on substrate 1 so as to be in contact with layer 3 made of the resistance member. Protective film 4 is provided on layer 3 made of the resistance member. The conventional chip resistor illustrated in FIG. 22 is disclosed in, for example, PTL 2.

CITATION LIST

Patent Literature

PTL 1: Unexamined Japanese Patent Publication No. 2010-118430

PTL 2: Unexamined Japanese Patent Publication No. 2000-106301

SUMMARY OF THE INVENTION

In the conventional chip resistor disclosed in PTL 1, heat generation of layer 3 made of the resistance member is increased in order to cope with high power. Therefore, there is a problem that the temperature of layer 3 made of the resistance member becomes high and high power cannot be coped with.

In the conventional chip resistor disclosed in PTL 2, whole layer 3 made of the resistance member is embedded in the recess, and hence there is a problem that only a portion in contact with substrate 1 made of an insulator dissipates heat.

An object of the present disclosure is to solve the conventional problems described above and to provide a chip resistor capable of coping with high power.

In order to solve the above problems, a chip resistor of the present disclosure includes an insulating substrate, a pair of electrodes, and a resistance member. The insulating substrate has a first region in the center and second regions at both ends of the first region when viewed from the upper face. A recess is provided in the first region of the insulating substrate. The pair of electrodes are provided on both ends of the upper face of the insulating substrate, respectively. The resistance member is provided at least in the recess of the insulating substrate. The resistance member is connected to each of the pair of electrodes. In addition, the resistance member has a trimming groove in the second region of the insulating substrate.

In the chip resistor of the present disclosure, the recess preferably has a meandering shape.

In the chip resistor of the present disclosure, it is preferable that a resistance member be further provided on the upper face of the insulating substrate.

In the chip resistor of the present disclosure, the resistance member is embedded in a recess provided in the insulating substrate, particularly in a meandering recess. Thus, a contact area between the resistance member and the insulating substrate increases. This makes it possible to effectively release heat generated by the resistance member to the insulating substrate. As a result, the temperature of the resistance member can be lowered. Therefore, the chip resistor exerts an excellent effect of being able to cope with high power.

DETAILED DESCRIPTION OF THE PREFERRED EMBODIMENTS

Hereinafter, exemplary embodiments of the present disclosure will be described with reference to the drawings. Note that the exemplary embodiments described below are merely embodiments of the invention according to the present disclosure, and the invention according to the present disclosure is not limited to the exemplary embodiments described below.

First Exemplary Embodiment

Figure 1:
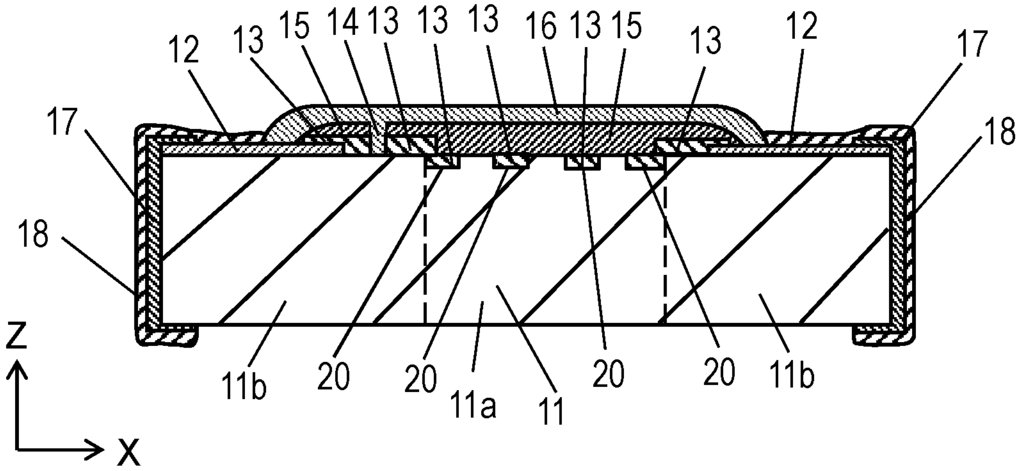
FIG. 1 is a cross-sectional view of a chip resistor according to a first exemplary embodiment of the present disclosure.
Figure 2:
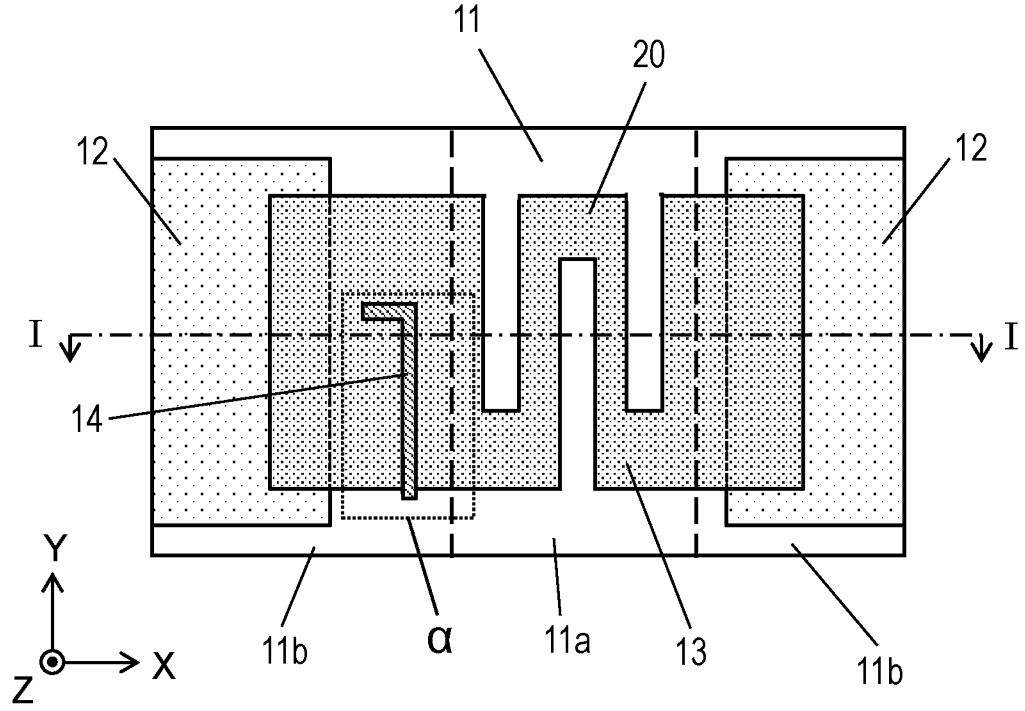
FIG. 2 is a top view of the chip resistor in the first exemplary embodiment.

A chip resistor according to a first exemplary embodiment of the present disclosure will be described below with reference to the drawings. FIG. 1 is a cross-sectional view of a chip resistor according to the first exemplary embodiment of the present disclosure, and FIG. 2 is a top view of the chip resistor. FIG. 1 is a cross-sectional view of the chip resistor illustrated in FIG. 2 taken along line I-I and a plane perpendicular to the sheet plane.

As illustrated in FIGS. 1 and 2, the chip resistor in the first exemplary embodiment of the present disclosure includes insulating substrate 11, a pair of upper-face electrodes 12, resistance member 13, trimming groove 14, first protective film 15, and second protective film 16. The pair of upper-face electrodes 12 are provided at both ends of the upper face of insulating substrate 11, respectively. Resistance member 13 is formed on a part of each of the pair of upper-face electrodes 12, on the upper face of insulating substrate 11, and between the pair of upper-face electrodes 12. Trimming groove 14 is provided in resistance member 13. First protective film 15 covers resistance member 13. Second protective film 16 covers first protective film 15.

A pair of end-face electrodes 17 are provided on both end faces of insulating substrate 11, respectively. The pair of end-face electrodes 17 are electrically connected to the pair of upper-face electrodes 12, respectively. On each of both end faces of insulating substrate 11, plating layer 18 is formed on a part of each of the pair of upper-face electrodes 12 and the surface of each of the pair of end-face electrodes 17.

In order to avoid complexity, first protective film 15, second protective film 16, the pair of end-face electrodes 17, and plating layer 18 are not illustrated in FIG. 2.

Note that XYZ orthogonal coordinates are defined with a thickness direction of insulating substrate 11 as a Z-axis, a plane parallel to the upper face of insulating substrate 11 as an XY plane, a direction from one to the other of the pair of upper-face electrodes 12 as an X-axis, and a direction perpendicular to the X-axis as a Y-axis. The cross-sectional view illustrated in FIG. 1 is a cross-sectional view taken along a plane parallel to the XZ plane illustrated in FIG. 2 through line I-I. In all the drawings to be described below, the XYZ orthogonal coordinates will be defined as described above.

In the above configuration, insulating substrate 11 is made of alumina containing 96% $Al_2O_3$. Insulating substrate 11 has a rectangular shape (rectangle in a top view). This insulating substrate 11 is divided into first region 11*a* in the center and second regions 11*b* at both ends of first region 11*a*. First region 11*a* is provided with meandering recess 20 in a top view. Here, the term "top view" means viewing from a direction in which the upper face of insulating substrate 11 faces.

Figure 3:
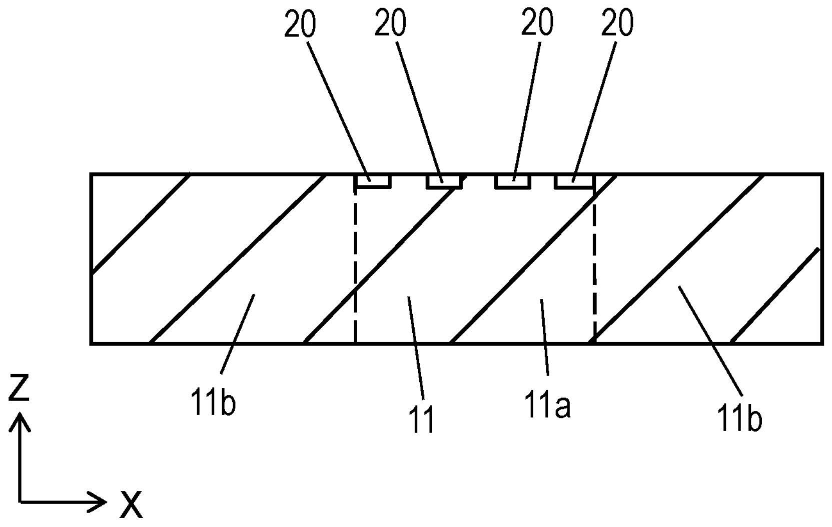
FIG. 3 is a cross-sectional view of the insulating substrate in which a recess is formed in the first exemplary embodiment.
Figure 4:
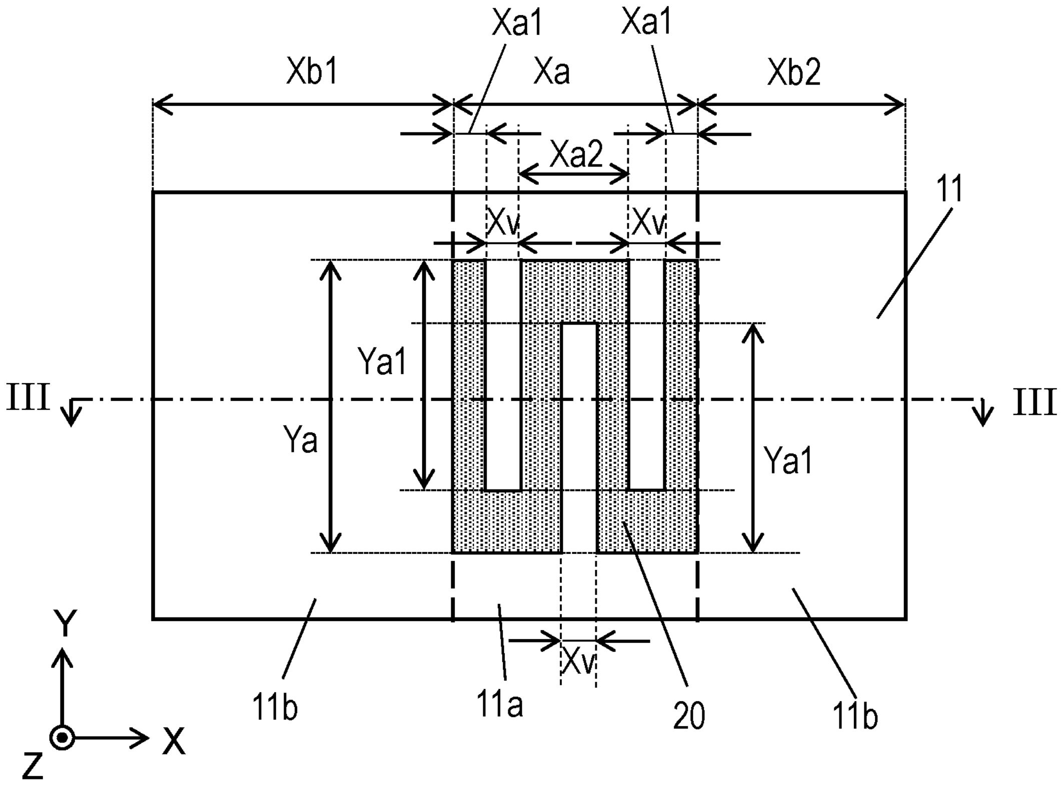
FIG. 4 is a top view of the insulating substrate with the recess formed therein.

Insulating substrate 11 in which meandering recess 20 is formed will be described. Insulating substrate 11 has a thickness of 0.4 mm, a length in the X-axis direction of 1.95 mm, and a length in the Y-axis direction of 1.2 mm. FIG. 3 is a cross-sectional view of the insulating substrate with recess 20 formed therein. FIG. 4 is a top view of the insulating substrate in which recess 20 is formed. FIG. 3 is a cross-sectional view of insulating substrate 11 illustrated in FIG. 4 taken along a plane perpendicular to the sheet plane through line III-III.

Width Xa of first region 11*a* in the X-axis direction is Xa=1.02 mm. With regard to the width of second region 11*b* in the X-axis direction, when the width of second region 11*b* on the left side in FIG. 4 is defined Xb1, and the width of second region 11*b* on the right side in FIG. 4 is defined as Xb2, Xb1=0.63 mm, and Xb2=0.3 mm.

Recess 20 is formed in a region having width Ya in the Y-axis direction between the left boundary and the right boundary of first region 11*a* in FIG. 4. The width of recess 20 is Xa1. Recess 20 extends in the Y-axis direction along the left boundary of first region 11*a* and extends in the X-axis direction when the length of recess 20 becomes Ya1. Then, recess 20 extends in the Y-axis direction (Y-axis positive direction) again at interval Xv from recess 20 extending in the Y-axis direction (Y-axis negative direction) described above. When recess 20 reciprocates once to have a length of Ya1, recess 20 extends again in the X-axis direction. Such a process is repeated, and recess 20 reaches the right boundary from the left boundary of first region 11*a* in FIG. 4.

In the first exemplary embodiment, the depth of recess 20 is 0.01 mm. Recess 20 has Xa1=0.15 mm, Ya=0.8 mm, Ya1=0.68 mm, and Xv=0.14 mm. Xa2=0.44 mm is satisfied. Hereinafter, the X-axis direction may be referred to as a longitudinal direction of the insulating substrate.

The pair of upper-face electrodes 12 are provided at both ends of the upper face of second region 11*b* of insulating substrate 11, respectively.

The pair of upper-face electrodes 12 are formed by printing and firing a thick-film material having a metal such as silver. Note that a pair of back face electrodes (not illustrated) may be provided at both ends of the back face of insulating substrate 11.

Resistance member 13 is provided between the pair of upper-face electrodes 12 on the upper face of insulating substrate 11. Resistance member 13 has a thickness of 0.02 mm, a length in the X-axis direction of 1.35 mm, and a length in the Y-axis direction of 0.8 mm.

Resistance member 13 is formed by printing a thick-film material made of copper-nickel, silver palladium, or ruthenium oxide, and then firing the printed thick-film material. Resistance member 13 partially overlaps and is connected to each of the pair of upper-face electrodes 12. In resistance member 13, two overlapping portions with the pair of upper-face electrodes 12 are formed. In FIGS. 1 and 2, both ends of resistance member 13 are formed on the upper faces of both ends of the pair of upper-face electrodes 12, but may be formed on the lower faces of both ends of the pair of upper-face electrodes 12. A current flows through resistance member 13 between the pair of upper-face electrodes 12.

This resistance member 13 is embedded in recess 20 in first region 11*a*. Therefore, resistance member 13 is formed in a meandering shape, whereby the effective length of resistance member 13 becomes long, and the potential difference per unit length becomes small, thus improving surge resistance. In addition, with resistance member 13 being embedded in recess 20, resistance members 13 do not face each other in the plane direction, and hence surge resistance is further improved.

Resistance member 13 is formed on the upper face of insulating substrate 11 in second region 11*b*. Resistance member 13 embedded in recess 20 is connected to resistance member 13 formed on the upper face of insulating substrate 11.

Figure 5:
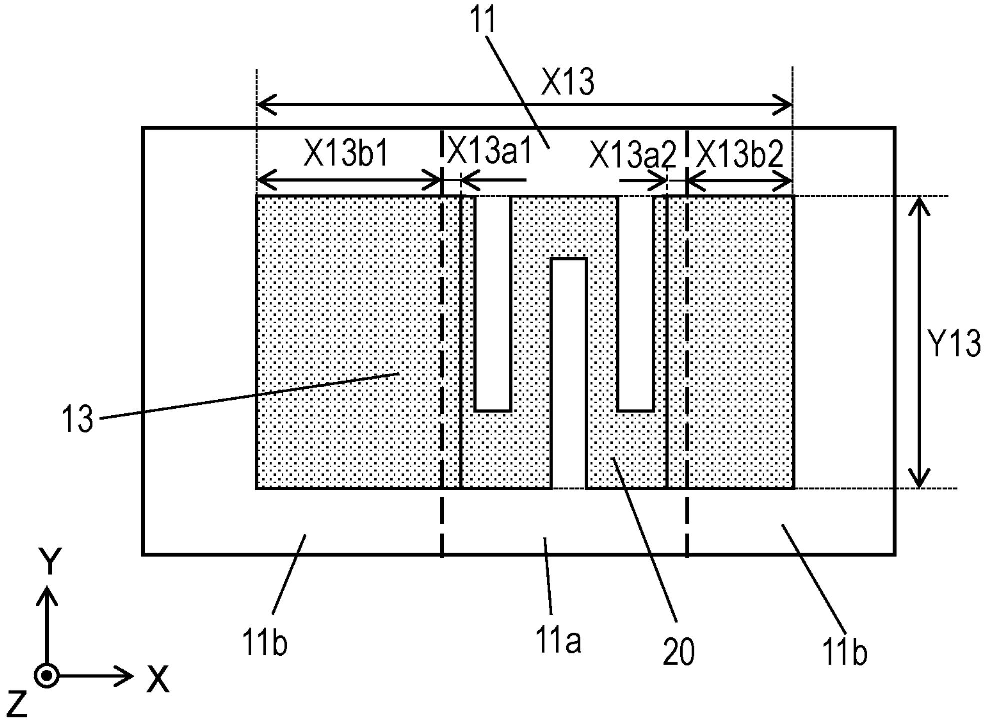
FIG. 5 is a top view of the insulating substrate when a resistance member is provided on the insulating substrate with the recess formed therein.

Next, insulating substrate 11 when resistance member 13 is provided on insulating substrate 11 with recess 20 formed therein will be described below. FIG. 5 is a top view of insulating substrate 11 when resistance member 13 is provided on insulating substrate 11 with recess 20 formed therein. In first region 11*a* of insulating substrate 11, resistance member 13 is embedded in recess 20. In second regions 11*b* of insulating substrate 11, a length of resistance member 13 extending in the X-axis direction from second region 11*b* on the left side in FIG. 5 is X13*b*1, and a length of resistance member 13 extending in the X-axis direction from second region 11*b* on the right side is defined as X13*b*2.

In first region 11*a*, a value in the X-axis direction of an overlapping width between resistance member 13 extending in the X-axis direction from second region 11*b* on the left side of FIG. 5 and a region where resistance member 13 is embedded in recess 20 is defined as X13*a*1. In first region 11*a*, a value in the X-axis direction of an overlapping width between resistance member 13 extending in the X-axis direction from second region 11*b* on the right side of FIG. 5 and a region where resistance member 13 is embedded in recess 20 is defined as X13*a*2. The size of whole resistance member 13 in the X-axis direction is defined as X13, and the size in the Y-axis direction is defined as Y13. In the first exemplary embodiment, X13=1.35 mm, Y13=0.8 mm, X13*a*1=0.08 mm, X13*a*2=0.08 mm, X13*b*1=0.33 mm, and X13*b*2=0.25 mm are satisfied.

Figure 6:
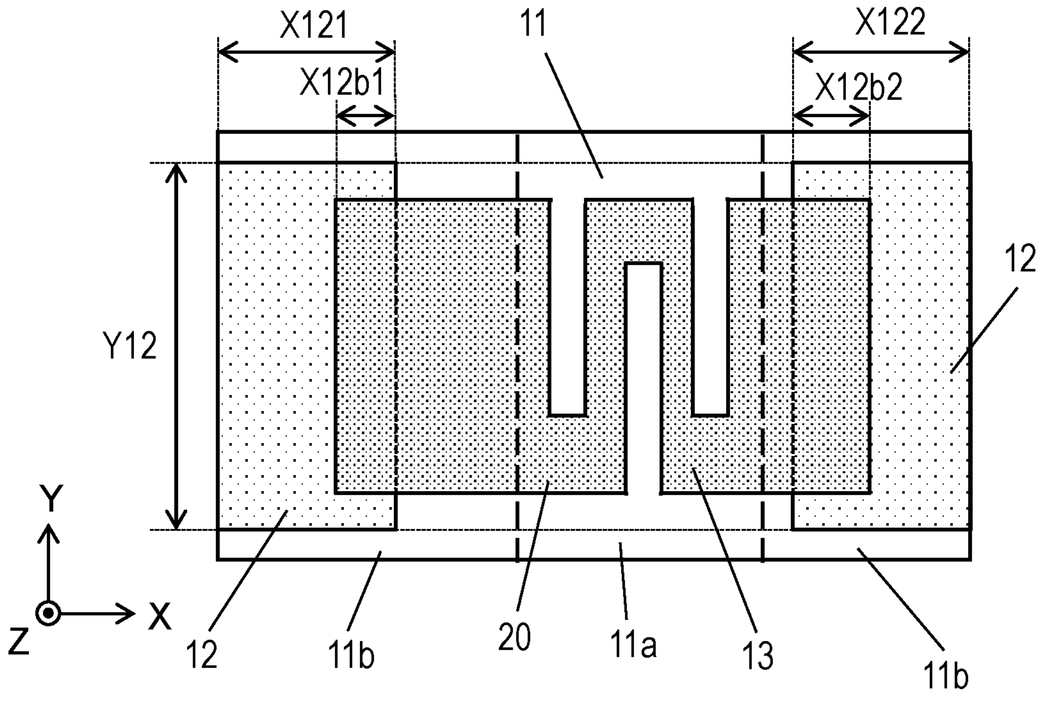
FIG. 6 is a top view illustrating a placement relationship between the resistance member formed on an insulating substrate and a pair of electrodes in the first exemplary embodiment.

Next, a relationship between resistance member 13 formed on insulating substrate 11 and the pair of upper-face electrodes 12 will be described with reference to FIG. 6. FIG. 6 is a top view illustrating a placement relationship between resistance member 13 formed on insulating substrate 11 and the pair of upper-face electrodes 12. Resistance member 13 partially overlaps and is connected to each of the pair of upper-face electrodes 12. Each of the pair of upper-face electrodes 12 is made of a metal such as silver having a thickness of 0.01 mm. That is, the thickness of each of the pair of electrodes 12 is 0.01 mm. Each of the pair of upper-face electrodes 12 has a rectangular shape having sides in the X-axis direction and the Y-axis direction. Each of the pair of upper-face electrodes 12 has the same side length in the Y-axis direction. The length of each of the pair of upper-face electrodes 12 in the Y-axis direction is defined as Y12. In the pair of upper-face electrodes 12, the length of one side in the X-axis direction of upper-face electrode 12 on the left side of the drawing in FIG. 6 is defined as X121, and the length of one side in the X-axis direction of upper-face electrode 12 on the right side of the drawing in FIG. 6 is defined as X122. In the first exemplary embodiment, X121=0.35 mm, X122=0.2 mm, X12*b*1=0.1 mm, X12*b*2=0.1 mm, and Y12=0.9 mm are satisfied.

Further, as illustrated in FIG. 2, trimming groove 14 is provided in resistance member 13 formed in second region 11*b*. It is difficult to adjust a resistance value by forming trimming groove 14 in resistance member 13 embedded in recess 20. However, it is easy to form trimming groove 14 in resistance member 13 formed on the upper face of insulating substrate 11 in second region 11*b*.

Trimming groove 14 is formed by irradiating resistance member 13 formed on the upper face of insulating substrate 11 in second region 11*b* with laser light. In FIG. 2, the shape of trimming groove 14 is an L shape but is not limited thereto. It is preferable that resistance member 13 embedded in recess 20 of first region 11*a* and resistance member 13 provided with trimming groove 14 of second region 11*b* form resistance member 13 as a whole in a meandering shape.

First protective film 15 covers resistance member 13 and is made of an insulator containing glass as a main component. First protective film 15 can reduce impact caused by laser light irradiation when trimming groove 14 in resistance member 13 is formed. After the formation of first protective film 15 on resistance member 13, first protective film 15 is irradiated with laser light to form trimming groove 14.

Second protective film 16 covers whole first protective film 15 and a part of each of the pair of upper-face electrodes 12 and is made of epoxy resin.

The pair of end-face electrodes 17 are provided on both end faces of insulating substrate 11, respectively, and is formed by printing a material made of Ag and a resin so as to be electrically connected to the upper faces of the pair of upper-face electrodes 12 exposed from second protective film 16. Note that end-face electrode 17 may be formed by sputtering a metallic material.

Further, plating layer 18 including a Ni plating layer and a Sn plating layer is formed on a part of each of the pair of upper-face electrodes 12 and each of the surface of the pair of end-face electrodes 17. At this time, plating layer 18 is in contact with second protective film 16. Note that a Cu plating layer may be provided below the Ni plating layer.

Figure 7:
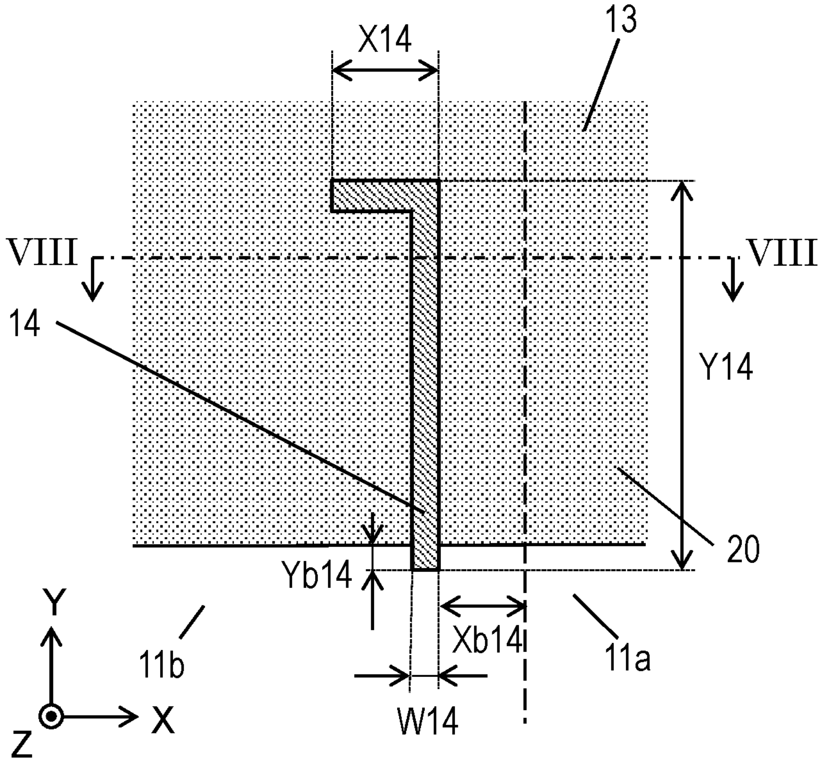
FIG. 7 is an enlarged view of a portion surrounded by a region α illustrated in FIG. 2 of the chip resistor in the first exemplary embodiment.
Figure 8:
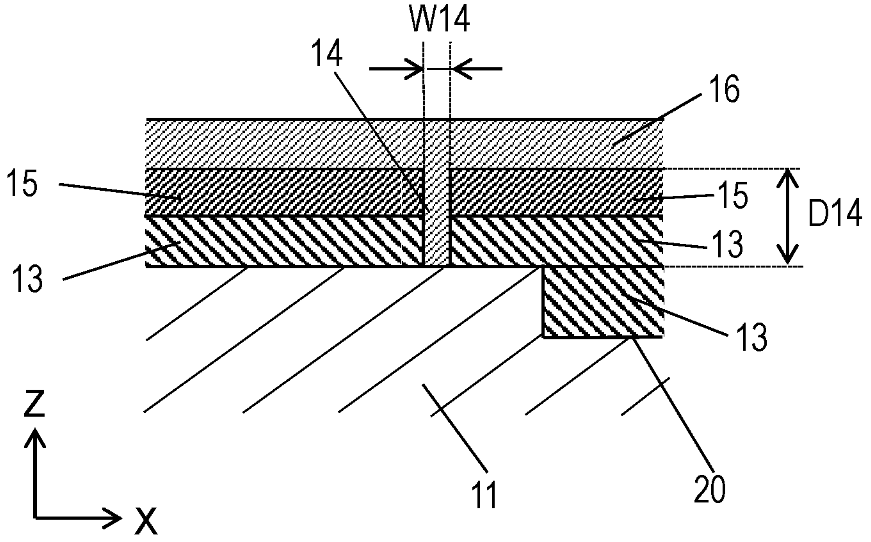
FIG. 8 is a cross-sectional view of region α of the chip resistor in the first exemplary embodiment.

Next, trimming groove 14 will be described with reference to FIGS. 7 and 8. FIG. 7 is an enlarged view of a portion surrounded by region α of the chip resistor illustrated in FIG. 2. FIG. 8 is a cross-sectional view of the chip resistor illustrated in FIG. 7 taken along line VIII-VIII.

Trimming groove 14 penetrates first protective film 15 and resistance member 13 from the surface of first protective film 15 and reaches the surface of insulating substrate 11. The inside of trimming groove 14 is filled with second protective film 16.

Trimming groove 14 is formed in second region 11*b* on the left side of FIG. 2 and has an L shape extending in the X-axis direction and extending in the Y-axis direction. The length of trimming groove 14 extending in the X-axis direction is defined as X14, and the length thereof extending in the Y-axis direction is defined as Y14. The width of trimming groove 14 is defined as W14, and the depth thereof is defined as D14. The distance of trimming groove 14 from the boundary between first region 11*a* and second region 11*b* on the left side of FIG. 2 is defined as Xb14. Trimming groove 14 extends beyond resistance member 13 along the Y-axis direction. The length of trimming groove 14 extending beyond this resistance member 13 is defined as Yb14. In the first exemplary embodiment, W14=0.03 mm, D14=0.02 mm, Xb14=0.6 mm, and Yb14=0.05 mm are satisfied.

As described above, in the first exemplary embodiment, since resistance member 13 is embedded in meandering recess 20 provided in insulating substrate 11, the contact area between resistance member 13 and insulating substrate 11 is large. Thereby, the heat generated by resistance member 13 can be effectively released to insulating substrate 11. As a result, the temperature of resistance member 13 can be lowered, and hence an effect of coping with high power can be obtained. That is, a high-power type chip resistor is obtained.

Second Exemplary Embodiment

Figure 9:
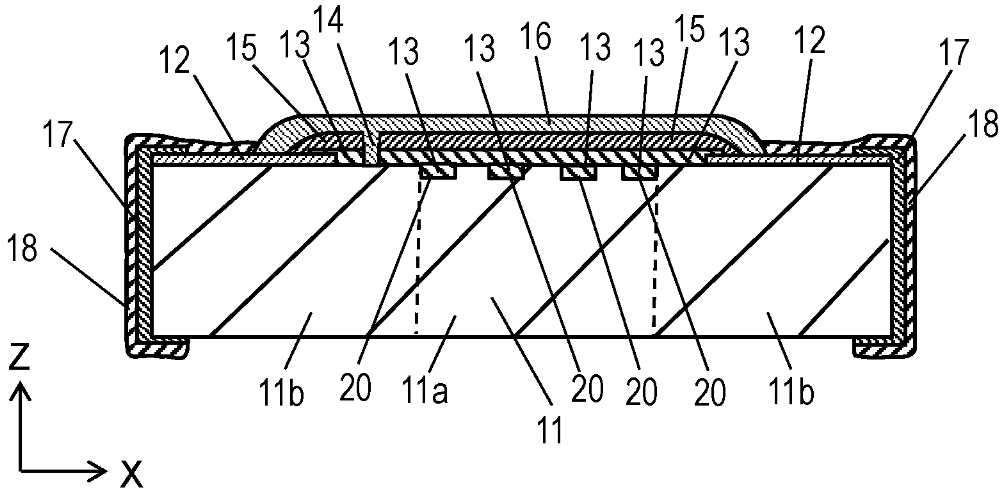
FIG. 9 is a cross-sectional view of a chip resistor in a second exemplary embodiment of the present disclosure.
Figure 10:
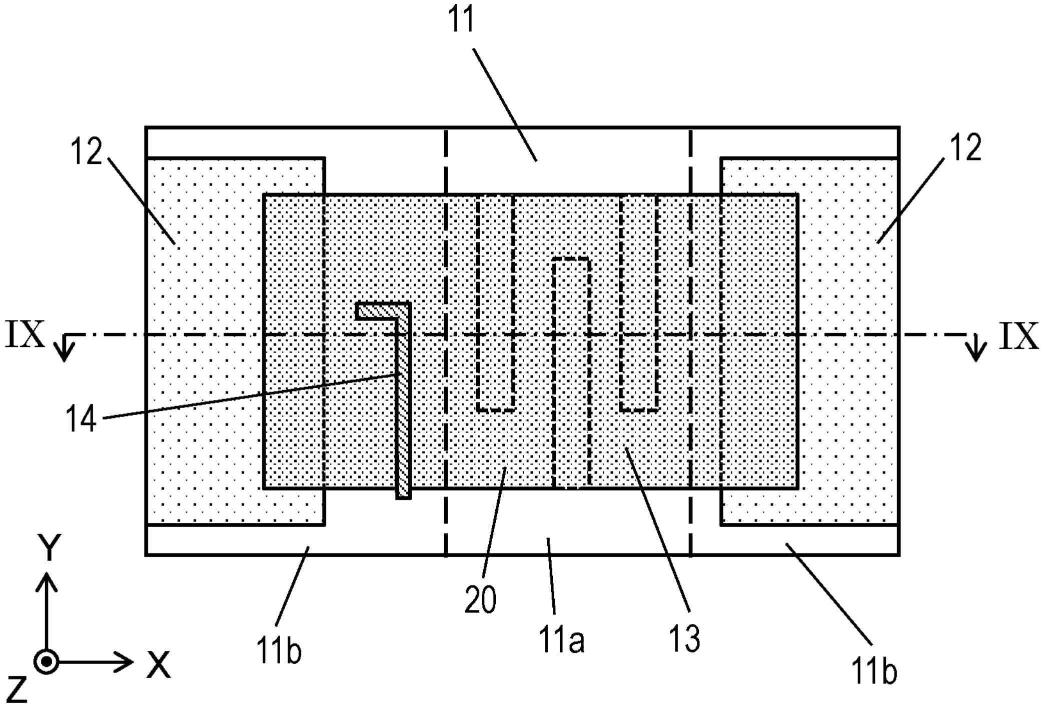
FIG. 10 is a top view of the chip resistor in the second exemplary embodiment.

A chip resistor according to a second exemplary embodiment of the present disclosure will be described below with reference to the drawings. FIG. 9 is a cross-sectional view of the chip resistor according to the second exemplary embodiment, and FIG. 10 is a top view of the chip resistor. FIG. 9 is a cross-sectional view of the chip resistor illustrated in FIG. 10 taken along line IX-IX and a plane perpendicular to the sheet plane. In FIG. 10, first protective film 15, second protective film 16, the pair of end-face electrodes 17, and plating layer 18 are not illustrated in order to avoid complexity. As illustrated in FIG. 9, in contrast to the chip resistor according to the first exemplary embodiment, the chip resistor according to the second exemplary embodiment is further provided with resistance member 13 on the upper face of insulating substrate 11 and the upper face of resistance member 13 embedded in recess 20. At this time, resistance member 13 embedded in recess 20 and upper resistance member 13 are formed integrally. Note that dimensions and materials of the respective elements in the chip resistor according to the second exemplary embodiment are similar to those of the chip resistor according to the first exemplary embodiment.

With this configuration, the contact area between resistance member 13 and insulating substrate 11 is further increased. Thereby, the heat generated by resistance member 13 can be more effectively released to insulating substrate 11.

Note that recess 20 does not necessarily have a meandering shape in a top view, but it is sufficient that recess 20 exist in a part of first region 11*a* and that a part of the meandering resistance member 13 be buried in recess 20. In this case as well, the contact area between resistance member 13 and insulating substrate 11 increases.

Third Exemplary Embodiment

Hereinafter, a chip resistor according to a third exemplary embodiment of the present disclosure will be described with reference to FIGS. 11 and 12.

Figure 11:
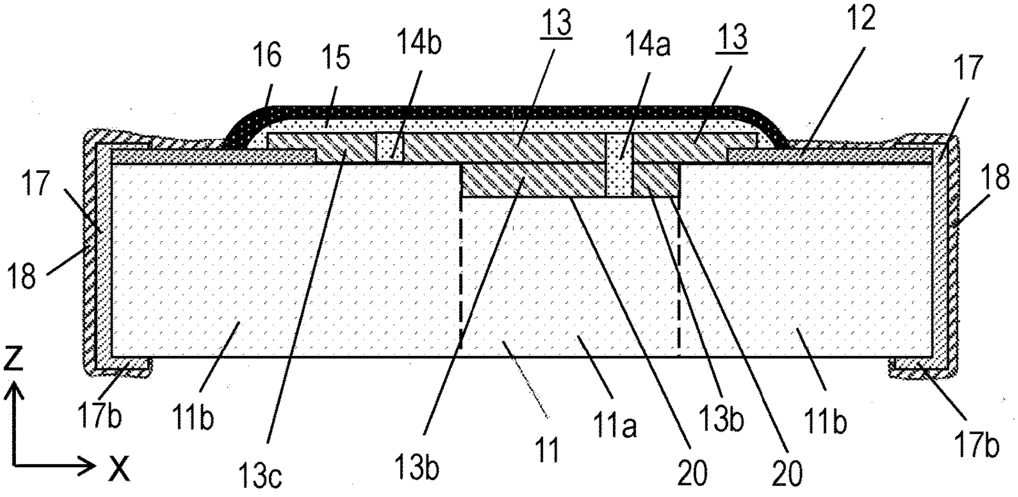
FIG. 11 is a cross-sectional view of a chip resistor in a third exemplary embodiment of the present disclosure.
Figure 12:
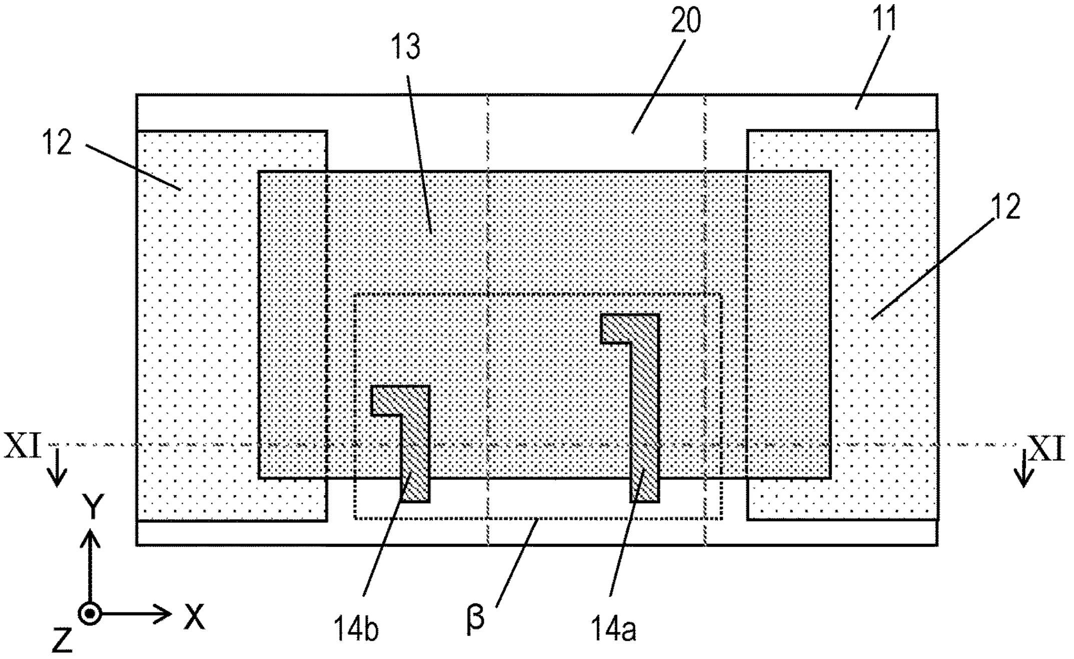
FIG. 12 is a top view of the chip resistor in the third exemplary embodiment.

FIG. 11 is a cross-sectional view of the chip resistor according to the third exemplary embodiment of the present disclosure, FIG. 12 is a top view of the chip resistor, and FIG. 11 is a cross-sectional view of the chip resistor illustrated in FIG. 12 taken along a plane parallel to an XZ plane through a line XI-XI. In FIG. 12, first protective film 15, second protective film 16, end-face electrode 17, and plating layer 18 are not illustrated in order to avoid complexity.

In FIGS. 11 and 12, recess 20 is provided in the center of the upper face of insulating substrate 11. In insulating substrate 11, a region provided with recess 20 is first region 11*a*, and both adjacent regions to recess 20 are second regions 11*b*. That is, the edge of recess 20 is the boundary between first region 11*a* and second region 11*b*. A pair of upper-face electrodes 12 are provided at both ends of the upper face of insulating substrate 11. On the upper face of insulating substrate 11, resistance member 13 is provided between the pair of upper-face electrodes 12. First trimming groove 14*a* is provided on first region 11*a* of this resistance member 13. Second trimming groove 14*b* is provided on second region 11*b*. Further, first protective film 15 is provided to cover resistance member 13. Moreover, second protective film 16 is provided to cover first protective film 15.

The chip resistor includes a pair of end-face electrodes 17 provided on both end faces of insulating substrate 11 so as to be electrically connected to the pair of upper-face electrodes 12, and plating layer 18 formed on a part of each of the pair of upper-face electrodes 12 and each of the surface of the pair of end-face electrodes 17.

In the above configuration, insulating substrate 11 is made of alumina containing 96% $Al_2O_3$ and has a rectangular shape (rectangle in a top view). This insulating substrate 11 is provided with recess 20.

The pair of upper-face electrodes 12 are provided at both ends of the upper face of insulating substrate 11 and is formed by printing and firing a thick-film material having a metal such as silver. Note that a pair of lower-face electrodes 17*b* are provided at both ends of the lower face of insulating substrate 11.

Further, resistance member 13 is formed by printing a thick-film material made of copper-nickel, silver palladium, or ruthenium oxide between the pair of upper-face electrodes 12 on the upper face of insulating substrate 11 and then firing the printed material. Resistance member 13 is connected to the pair of upper-face electrodes 12. In FIG. 11, both ends of resistance member 13 are formed on the upper faces of both ends of the pair of upper-face electrodes 12, but may be formed on the lower faces of both ends of the pair of upper-face electrodes 12. A current flows through resistance member 13 between the pair of upper-face electrodes 12.

This resistance member 13 is partially embedded in recess 20.

Figure 13:
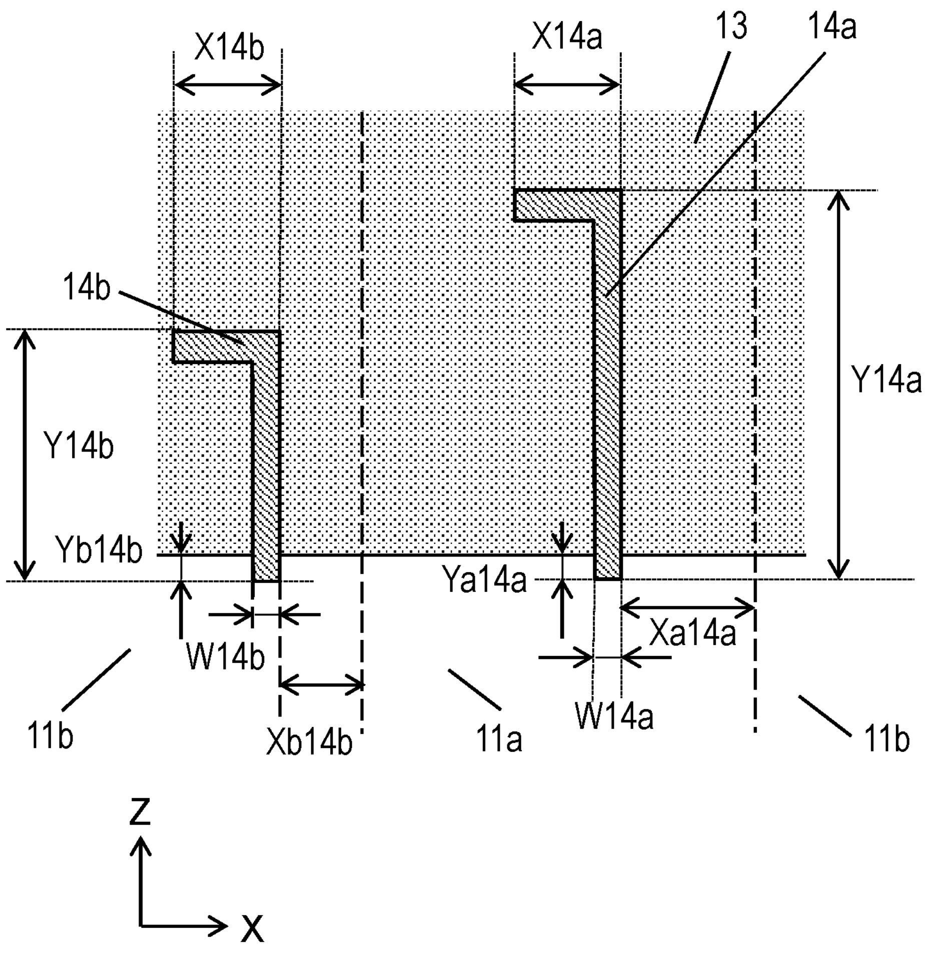
FIG. 13 is an enlarged view of a portion of the chip resistor surrounded by region β illustrated in FIG. 12.

Next, first trimming grooves 14*a*, 14*b* will be described with reference to FIG. 13. FIG. 13 is an enlarged view of a portion surrounded by region β of the chip resistor illustrated in FIG. 12.

In first region 11*a*, first trimming groove 14*a* penetrates first protective film 15 from the surface of first protective film 15 and resistance member 13 and reaches the surface of insulating substrate 11 with recess 20 formed therein. The inside of first trimming groove 14*a* is filled with second protective film 16.

Second trimming groove 14*b* penetrates first protective film 15 and resistance member 13 from the surface of first protective film 15 in second region 11*b* on the left side of FIG. 12 and reaches the surface of insulating substrate 11. The inside of second trimming groove 14*b* is filled with second protective film 16.

First trimming groove 14*a* is formed in first region 11*a* illustrated in FIG. 11 and has an L shape extending in the X-axis direction and extending in the Y-axis direction. The length of first trimming groove 14*a* extending in the X-axis direction is defined as X14*a*, and the length thereof extending in the Y-axis direction is defined as Y14*a*. The width of first trimming groove 14*a* is defined as W14*a*, and the depth thereof is defined as D14*a*. The distance of first trimming groove 14*a* from the boundary between first region 11*a* and second region 11*b* on the right side of FIG. 12 is defined as Xa14*a*. First trimming groove 14*a* extends beyond resistance member 13 along the Y-axis direction. The length of trimming groove 14 extending beyond this resistance member 13 is defined as Ya14*a*. In the third exemplary embodiment, W14*a*=0.03 mm, D14*a*=0.02 mm, X14*a*=0.05 mm, Y14*a*=0.4 mm, Xb14*a*=0.3 mm, and Yb14*a*=0.05 mm are satisfied.

Second trimming groove 14*b* is formed in second region 11*b* on the left side of FIG. 12 and has an L shape extending in the X-axis direction and extending in the Y-axis direction. The length of second trimming groove 14*b* extending in the X-axis direction is defined as X14*b*, and the length thereof extending in the Y-axis direction is defined as Y14*b*. The width of second trimming groove 14*b* is defined as W14*b*, and the depth thereof is defined as D14*b*. The distance of second trimming groove 14*b* from the boundary between first region 11*a* and second region 11*b* on the left side of FIG. 12 is defined as Xb14*b*. Second trimming groove 14*b* extends beyond resistance member 13 along the Y-axis direction. The length of trimming groove 14 extending beyond this resistance member 13 is defined as Yb14*b*. In the third exemplary embodiment, W14*b*=0.03 mm, D14*b*=0.01 mm, X14*b*=0.05 mm, Y14*b*=0.3 mm, Xb14*b*=0.05 mm, and Yb14*b*=0.05 mm are satisfied. The length, in the lateral direction of insulating substrate 11, of first trimming groove 14*a* provided in meandering resistance portion 13*b* is larger than the length, in the lateral direction of insulating substrate 11, of second trimming groove 14*b* provided in rectangular parallelepiped resistance portion 13*c* on the upper face of insulating substrate 11. With this configuration, the current concentrates on meandering resistance portion 13*b* having high heat dissipation, so that the chip resistor has an effect of being able to cope with high power.

First trimming groove 14*a* and second trimming groove 14*b* are formed by irradiating resistance member 13 formed on the upper face of insulating substrate 11 with laser. In FIG. 12, first trimming groove 14*a* and second trimming groove 14*b* each have an L shape, but are not limited thereto.

First protective film 15 covers resistance member 13. First protective film 15 is made of an insulator containing glass as a main component. First protective film 15 can reduce impact caused by laser light irradiation when first trimming groove 14*a* and second trimming groove 14*b* are formed. After the formation of first protective film 15 on resistance member 13, first protective film 15 is irradiated with laser light to form first trimming groove 14*a* and second trimming groove 14*b*.

Second protective film 16 is made of epoxy resin so as to cover whole first protective film 15 and a part of each of the pair of upper-face electrodes 12. The pair of end-face electrodes 17 are formed by printing a material made of Ag and a resin so as to be electrically connected to the upper faces of the pair of upper-face electrodes 12 provided on both end faces of insulating substrate 11 and exposed from second protective film 16. Note that end-face electrode 17 may be formed by sputtering a metallic material.

Further, plating layer 18 including a Ni plating layer and a Sn plating layer is formed on a part of each of the pair of upper-face electrodes 12 and the surface of each of the pair of end-face electrodes 17. At this time, plating layer 18 is in contact with second protective film 16. Note that a Cu plating layer may be provided below the Ni plating layer.

As described above, in the third exemplary embodiment, resistance member 13 is partially embedded in recess 20 provided in insulating substrate 11, first trimming groove 14*a* is formed in meandering resistance portion 13*b*, and second trimming groove 14*b* is formed in rectangular parallelepiped resistance portion 13*c* provided on the upper face of insulating substrate 11. Therefore, after the resistance value is greatly changed by first trimming groove 14*a*, the resistance value can be adjusted with high accuracy by second trimming groove 14*b*, and as a result, the chip resistor has an effect of being able to improve the resistance value accuracy.

Fourth Exemplary Embodiment

Figure 14:
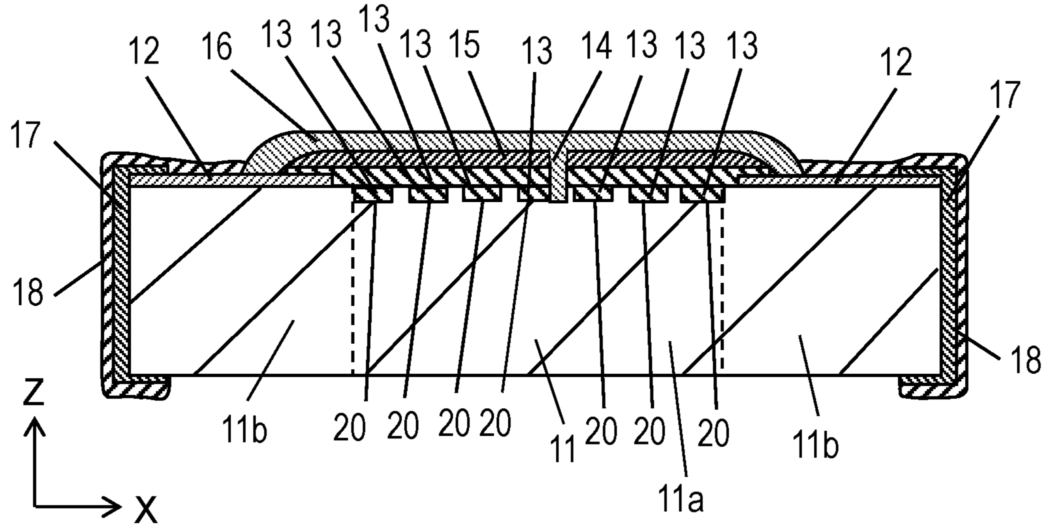
FIG. 14 is a cross-sectional view of a chip resistor in a fourth exemplary embodiment of the present disclosure.
Figure 15:
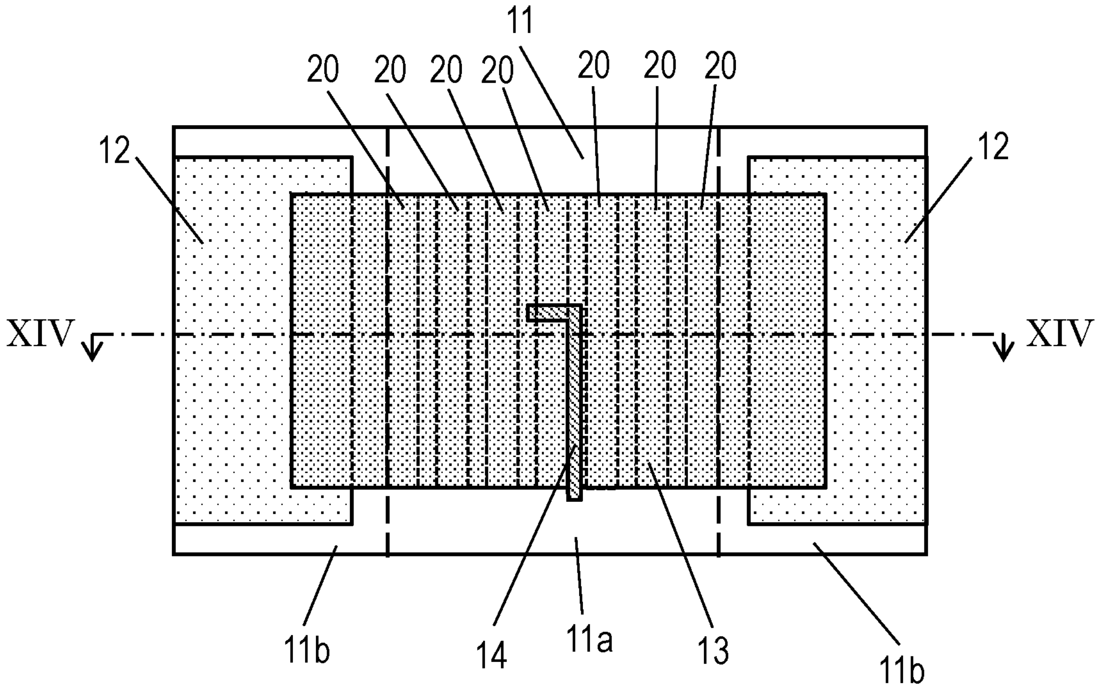
FIG. 15 is a top view of the chip resistor in the fourth exemplary embodiment.

A chip resistor according to a fourth exemplary embodiment of the present disclosure will be described below with reference to the drawings. FIG. 14 illustrates a cross-sectional view of the chip resistor according to the fourth exemplary embodiment of the present disclosure, and FIG. 15 illustrates a top view of the chip resistor. FIG. 14 is a cross-sectional view of the chip resistor illustrated in FIG. 15 taken along line XIV-XIV and a plane perpendicular to the sheet plane. In FIG. 15, first protective film 15, second protective film 16, the pair of end-face electrodes 17, and plating layer 18 are not illustrated in order to avoid complexity.

The chip resistor according to the fourth exemplary embodiment includes insulating substrate 11, a pair of upper-face electrodes 12, resistance member 13, first protective film 15, second protective film 16, a pair of end-face electrodes 17, and plating layer 18. The pair of upper-face electrodes 12 are provided at both ends of the upper face of insulating substrate 11, respectively. A plurality of belt-shaped recesses 20 are provided on the upper face of insulating substrate 11. Resistance member 13 is embedded in recess 20 of insulating substrate 11, and resistance member 13 is provided to cover recess 20. Resistance member 13 is in contact with each of the pair of upper-face electrodes 12 and is electrically connected to the pair of upper-face electrodes 12. First protective film 15 and second protective film 16 are provided on resistance member 13. Trimming groove 14 reaching insulating substrate 11 from the surface of first protective film 15 is provided between recesses 20. Trimming groove 14 is filled with second protective film 16. The pair of end-face electrodes 17 are provided on the outer faces in the longitudinal direction of insulating substrate 11. The pair of end-face electrodes 17 are in contact with and electrically connected to the pair of upper-face electrodes 12, respectively. Plating layer 18 is provided on the surface of each of the pair of end-face electrodes 17. Note that dimensions and materials of the respective elements in the chip resistor according to the fourth exemplary embodiment are similar to those of the chip resistor according to the first exemplary embodiment.

In the chip resistor according to the present exemplary embodiment, the heat dissipation is improved by increasing the contact area between the substrate having good heat dissipation and the resistor. It is thereby possible to increase the power of the chip resistor.

Fifth Exemplary Embodiment

Figure 16:
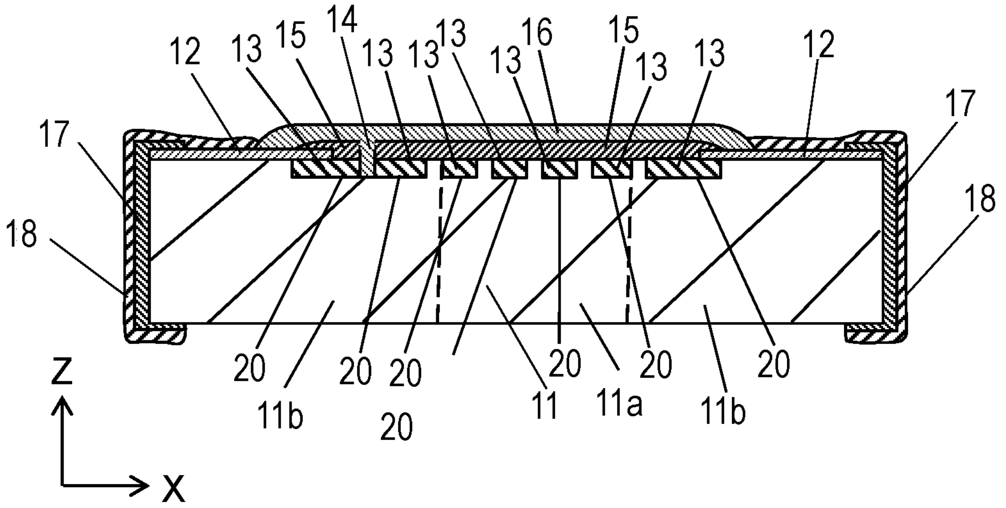
FIG. 16 is a cross-sectional view of a chip resistor in a fifth exemplary embodiment of the present disclosure.
Figure 17:
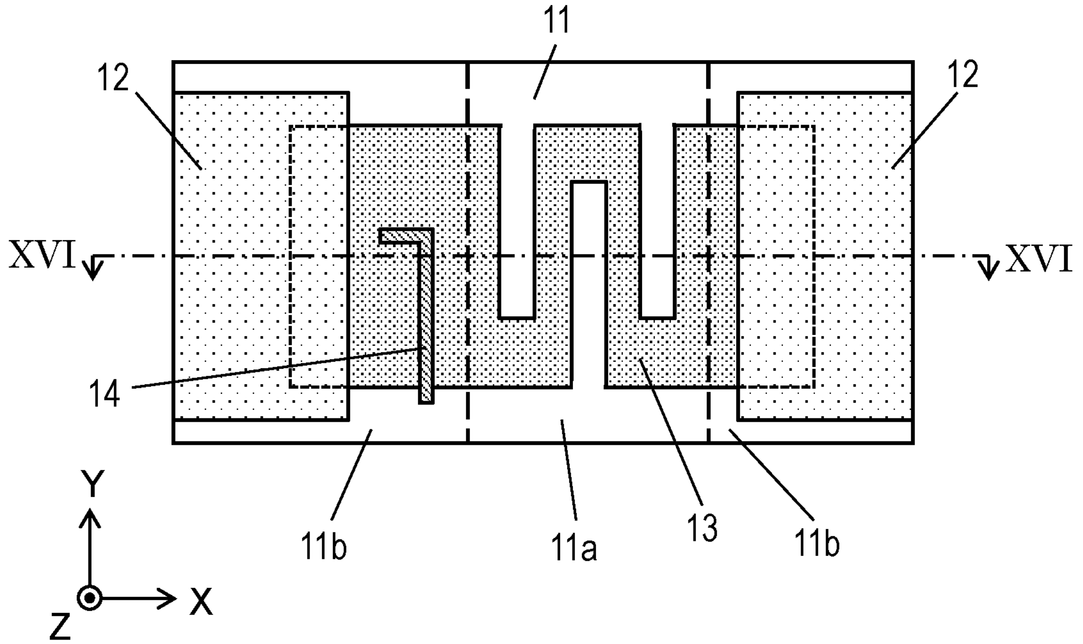
FIG. 17 is a top view of the chip resistor in the fifth exemplary embodiment.

A chip resistor according to a fifth exemplary embodiment of the present disclosure will be described below with reference to the drawings. FIG. 16 illustrates a cross-sectional view of the chip resistor according to the fifth exemplary embodiment of the present disclosure, and FIG. 17 illustrates a top view of the chip resistor. FIG. 16 is a cross-sectional view of the chip resistor illustrated in FIG. 17 taken along line XVI-XVI and a plane perpendicular to the sheet plane. In FIG. 17, first protective film 15, second protective film 16, the pair of end-face electrodes 17, and plating layer 18 are not illustrated in order to avoid complexity.

The chip resistor according to the fifth exemplary embodiment includes insulating substrate 11, resistance member 13, a pair of upper-face electrodes 12, first protective film 15, second protective film 16, a pair of end-face electrodes 17, and plating layer 18. Resistance member 13 is provided on the upper face of insulating substrate 11. The pair of upper-face electrodes 12 are provided at both ends of the upper face of insulating substrate 11, respectively, and is electrically connected to resistance member 13. Insulating substrate 11 has first region 11*a* in the center thereof and second regions 11*b* at both ends of first region 11*a*. Meandering recess 20 is provided in first region 11*a* of insulating substrate 11 in a top view. Resistance member 13 is embedded in recess 20. Resistance member 13 has substantially the same shape as recess 20 formed in first region 11*a*. Trimming groove 14 is provided in resistance member 13 formed in second region 11*b*. Trimming groove 14 is filled with second protective film 16. The pair of end-face electrodes 17 are provided on the outer faces in the longitudinal direction of insulating substrate 11. The pair of end-face electrodes 17 are in contact with and electrically connected to the pair of upper-face electrodes 12, respectively. Plating layer 18 is provided on the surface of each of the pair of end-face electrodes 17. Note that dimensions and materials of the respective elements in the chip resistor according to the fifth exemplary embodiment are similar to those of the chip resistor according to the first exemplary embodiment.

According to the chip resistor of the fifth exemplary embodiment, since the contact area with the substrate having good heat dissipation is improved, the heat dissipation of the chip resistor is improved. Hence, it is possible to increase the power of the chip resistor.

Sixth Exemplary Embodiment

Figure 18:
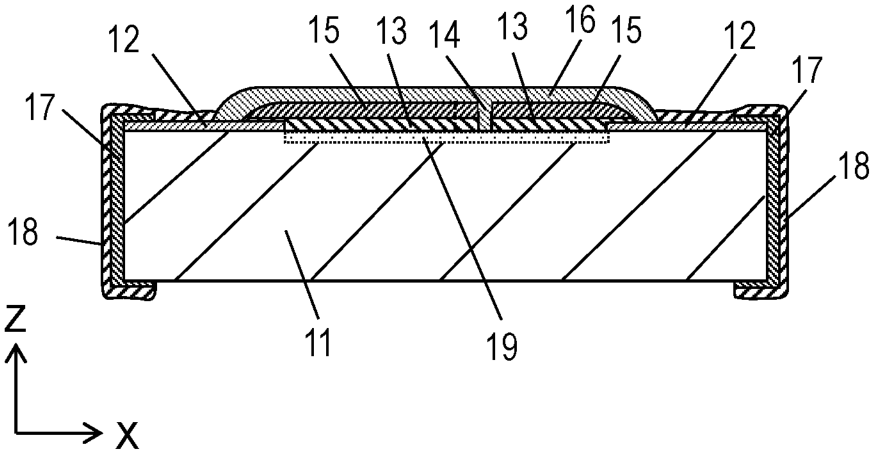
FIG. 18 is a cross-sectional view of a chip resistor in a sixth exemplary embodiment of the present disclosure.
Figure 19:
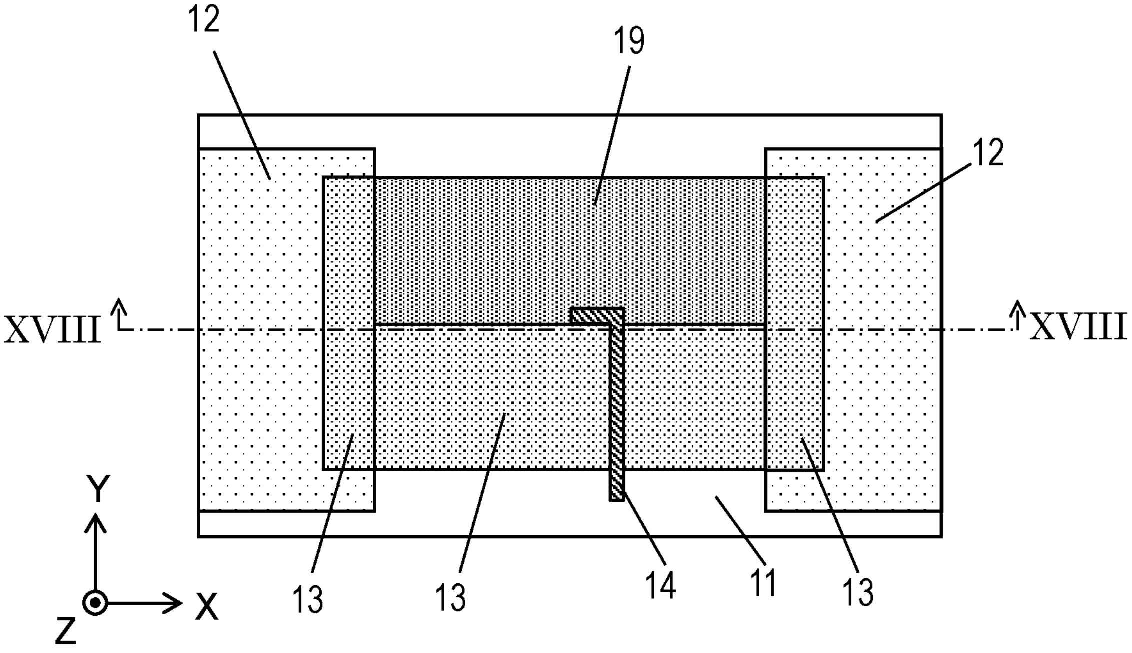
FIG. 19 is a top view of the chip resistor in the sixth exemplary embodiment.
Figure 20:
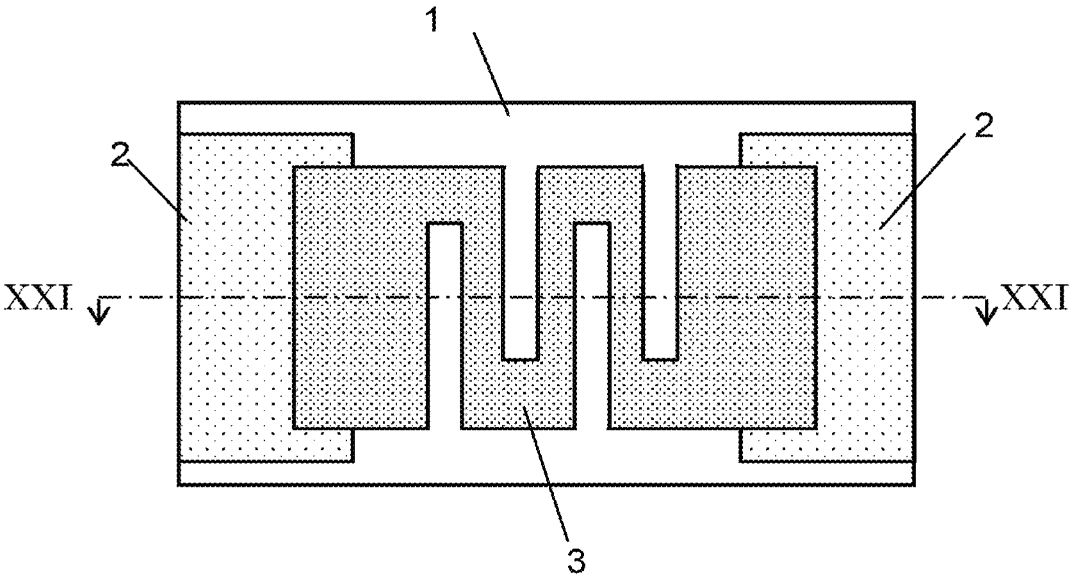
FIG. 20 is a top view of a main part of a conventional chip resistor.
Figure 21:
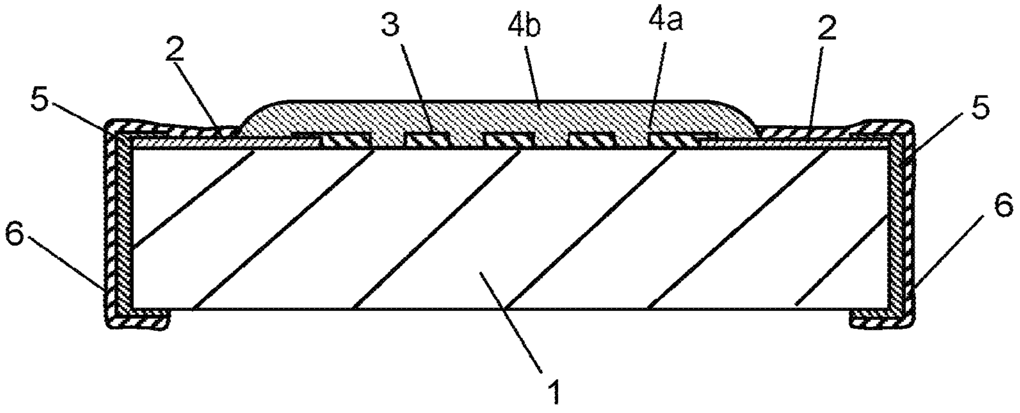
PRIOR ART FIG.21
FIG. 21 is a cross-sectional view of the conventional chip resistor.
Figure 22:
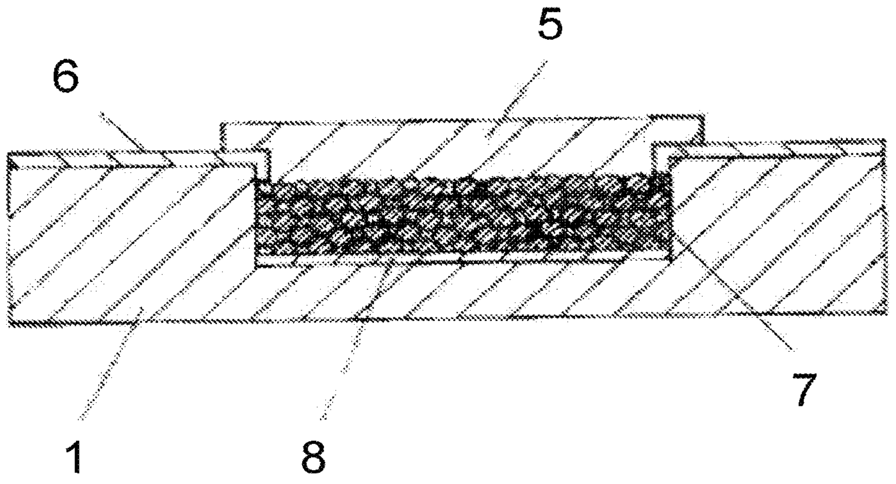
FIG. 22 is a cross-sectional view of another conventional chip resistor.

A chip resistor according to a sixth exemplary embodiment of the present disclosure will be described below with reference to the drawings. FIG. 18 illustrates a cross-sectional view of the chip resistor according to the sixth exemplary embodiment of the present disclosure, and FIG. 19 illustrates a top view of the chip resistor. FIG. 18 is a cross-sectional view of the chip resistor illustrated in FIG. 19 taken along line XVIII-XVIII and a plane perpendicular to the sheet plane. In FIG. 19, first protective film 15, second protective film 16, the pair of end-face electrodes 17, and plating layer 18 are not illustrated in order to avoid complexity.

The chip resistor according to the sixth exemplary embodiment includes insulating substrate 11, a pair of upper-face electrodes 12, resistance member 13, first protective film 15, second protective film 16, a pair of end-face electrodes 17, and plating layer 18. The pair of upper-face electrodes 12 are provided at both ends of the upper face of insulating substrate 11, respectively. Resistance member 13 is in contact with the pair of upper-face electrodes 12 and is electrically connected to upper-face electrode 12. In addition, resistance member 13 has trimming groove 14. First protective film 15 and second protective film 16 are formed on the upper face of insulating substrate 11 to cover at least resistance member 13. The pair of end-face electrodes 17 are provided on the outer faces in the longitudinal direction of first protective film 15 and insulating substrate 11. Plating layer 18 is provided on the surface of each of the pair of end-face electrodes 17.

Recess 20 is provided on the upper face of insulating substrate 11, and hot spot 19 is provided in this recess 20. Hot spot 19 is a portion (current concentration portion) of resistance member 13 where the current is concentrated. Note that dimensions and materials of the respective elements in the chip resistor according to the sixth exemplary embodiment are similar to those of the chip resistor according to the first exemplary embodiment.

According to the sixth exemplary embodiment, it is possible to increase the contact area of hot spot 19 with the substrate having high heat dissipation, thereby achieving high power of the chip resistor.

(Aspects)

Aspects of the chip resistor of the present disclosure will be described below.

(First Aspect)

A chip resistor according to a first aspect of the present disclosure includes insulating substrate (11), a pair of electrodes (12), and resistance member (13). Insulating substrate (11) has first region (11*a*) in the center and second regions (11*b*) at both ends of first region (11*a*) when viewed from the upper face. Recess (20) is provided in first region (11*a*) of insulating substrate (11). The pair of electrodes are provided at both ends of the upper face of insulating substrate (11), respectively. Resistance member (13) is provided at least in recess (20) of insulating substrate (11). Resistance member (13) is connected to each of the pair of electrodes (12). Resistance member (13) has trimming groove (14) in second region (11*b*) of insulating substrate (11).

(Second Aspect)

In a chip resistor according to a second aspect of the present disclosure, in the first aspect, recess (20) has a meandering shape.

(Third Aspect)

In a chip resistor according to a third aspect of the present disclosure, in the first aspect, resistance member (13) is further provided on the upper face of insulating substrate (11).

(Fourth Aspect)

A chip resistor according to a fourth aspect of the present disclosure includes insulating substrate (11), a pair of upper-face electrodes (12), resistance member (13), a protective layer, end-face electrode (17), and a lower-face electrode. Insulating substrate (11) has a rectangular shape. Recess (20) is provided on the upper face of insulating substrate (11). The pair of upper-face electrodes (12) are provided on the upper face of insulating substrate (11). Resistance member (13) is provided on the upper face of insulating substrate (11) and in recess (20). Resistance member (13) is electrically connected to the pair of upper-face electrodes (12). Resistance member (13) has one or a plurality of trimming grooves (14). The protective layer is provided on the upper face of insulating substrate (11) and covers at least resistance member (13). End-face electrode (17) is provided on the outer face in the longitudinal direction of insulating substrate (11). End-face electrode (17) is electrically connected to one of upper-face electrodes (12). Lower-face electrode (17*b*) is provided on the lower face of insulating substrate (11). Lower-face electrode (17*b*) is electrically connected to end-face electrode (17).

(Fifth Aspect)

In a chip resistor according to a fifth aspect of the present disclosure, in the fourth aspect, the plurality of trimming grooves (14) include first trimming groove (14*a*) and second trimming groove (14*b*). First trimming groove (14*a*) is disposed on recess (20). Second trimming groove (14*b*) is disposed on a position different from recess (20) on insulating substrate (11). The length, in the lateral direction of insulating substrate (11), of first trimming groove (14*a*) is larger than the length, in the lateral direction of insulating substrate (11), of second trimming groove (14*b*).

(Sixth Aspect)

A chip resistor according to a sixth aspect of the present disclosure includes insulating substrate (11), a pair of upper-face electrodes (12), resistance member (13), first protective film (15), second protective film (16), and end-face electrode (17). Insulating substrate (11) has a rectangular shape. A plurality of belt-shaped recesses (20) are provided on the upper face of insulating substrate (11). The pair of upper-face electrodes (12) are provided at both ends of the upper face of insulating substrate (11), respectively. Resistance member (13) is provided on at least recess (20) of insulating substrate (11). Resistance member (13) is electrically connected to each of the pair of upper-face electrodes (12). First protective film (15) is provided on the upper face of resistance member (13). End-face electrode (17) is provided from the outer face in the longitudinal direction of insulating substrate (11) to the lower face thereof. End-face electrode (17) is electrically connected to upper-face electrode (12). Trimming groove (14) is formed in resistance member (13) and first protective film (15). Trimming groove (14) is formed to reach belt-shaped recess (20) in insulating substrate (11) from the upper face of first protective film (15). Second protective film (16) is provided on first protective film (15). Trimming groove (14) is filled with second protective film (16).

(Seventh Aspect)

A chip resistor according to a seventh aspect of the present disclosure includes insulating substrate (11), a pair of upper-face electrodes (12), resistance member (13), first protective film (15), second protective film (16), and end-face electrode (17). Insulating substrate (11) is provided with meandering recess (20) on its upper face. The pair of upper-face electrodes (12) are provided at both ends of the upper face of insulating substrate (11), respectively. Resistance member (13) is embedded in at least meandering recess (20) of insulating substrate (11). Resistance member (13) includes meandering resistance portion (13*b*) and a pair of rectangular parallelepiped resistance portions (13*c*). Meandering resistance portion (13*b*) is embedded in meandering recess (20). The pair of rectangular parallelepiped resistance portions (13*c*) are provided on the upper face of insulating substrate (11). The pair of rectangular parallelepiped resistance portions (13*c*) are disposed at both ends of meandering resistance portion (13*b*), respectively. Each of the pair of rectangular parallelepiped resistance portions (13*c*) is electrically connected to the pair of upper-face electrodes (12). First protective film (15) is provided on the upper face of resistance member (13). End-face electrode (17) is provided from the outer face in the longitudinal direction of insulating substrate (11) to the lower face thereof. End-face electrode (17) is electrically connected to one of upper-face electrodes (12). Trimming groove (14) is formed in resistance member (13) and first protective film (15). Trimming groove (14) is formed to reach recess (20) in insulating substrate (11) from the upper face of first protective film (15) via rectangular parallelepiped resistance portion (13*c*). Second protective film (16) is provided on first protective film (15). Trimming groove (14) is filled with second protective film (16).

(Eighth Aspect)

A chip resistor according to an eighth aspect of the present disclosure includes insulating substrate (11), a pair of upper-face electrodes (12), resistance member (13), protective films (15, 16), and end-face electrode (17). Recess (20) is provided on the upper face of insulating substrate (11). Resistance member (13) is provided on the upper face of insulating substrate (11). The pair of upper-face electrodes (12) are provided at both ends of the upper face of insulating substrate (11), respectively. Resistance member (13) is provided on insulating substrate (11). Resistance member (13) is electrically connected to each of the pair of upper-face electrodes (12). Resistance member (13) has trimming groove (14). Protective films (15, 16) are provided on the upper face of insulating substrate (11) to cover at least resistance member (13). Recess (20) provided on the upper face of insulating substrate (11) is disposed in current concentration portion (19) near trimming groove (14).

The chip resistor according to the present disclosure has an effect of coping with high power, and is particularly useful in a high-power type chip resistor formed of a thick-film resistance member used in various electronic devices, and the like.

The chip resistor of the present disclosure has an effect of providing a chip resistor capable of adjusting a resistance value with high accuracy and capable of coping with high power, and is particularly useful for a chip resistor formed of a thick-film resistance member used in various electronic devices, and the like.

The invention claimed is:

1. A chip resistor comprising:
- an insulating substrate having a rectangular shape and provided with a recess on an upper face;
- a pair of upper-face electrodes provided on the upper face of the insulating substrate;
- a resistance member provided on the insulating substrate and electrically connected to the pair of upper-face electrodes, the resistance member having a trimming groove;
- a protective layer provided on the upper face of the insulating substrate to cover at least the resistance member;
- an end-face electrode provided on an outer face in a longitudinal direction of the insulating substrate and electrically connected to the upper-face electrode; and
- a lower-face electrode provided on a lower face of the insulating substrate and electrically connected to the end-face electrode,
- wherein the resistance member is provided on both the upper face of the insulating substrate and an embedded portion embedded in the recess, and
- wherein a length, in a lateral direction of the insulating substrate, of a first trimming groove provided in the resistance member provided in the embedded portion is larger than a length, in the lateral direction of the insulating substrate, of a second trimming groove provided in the resistance member provided on the upper face of the insulating substrate.

2. A chip resistor comprising:
- an insulating substrate provided with a meandering recess on an upper face;
- a pair of upper-face electrodes provided at both ends of the upper face of the insulating substrate;
- a resistance member including a meandering resistance portion embedded in the meandering recess of the insulating substrate and a pair of rectangular parallelepiped resistance portions provided on both end sides of the meandering resistance portion, the pair of rectangular parallelepiped resistance portions being electrically connected to the pair of upper-face electrodes, respectively;

a first protective film provided on an upper face of the resistance member; and an end-face electrode provided from an outer face in a longitudinal direction of the insulating substrate to a lower face of the insulating substrate and electrically connected to the upper-face electrode, wherein in the meandering recess of the insulating substrate, a trimming groove is provided from an upper face of the first protective film via the rectangular parallelepiped resistance portion of the resistance member, and the trimming groove is filled with a second protective film.

* * * * *